Figure 10:
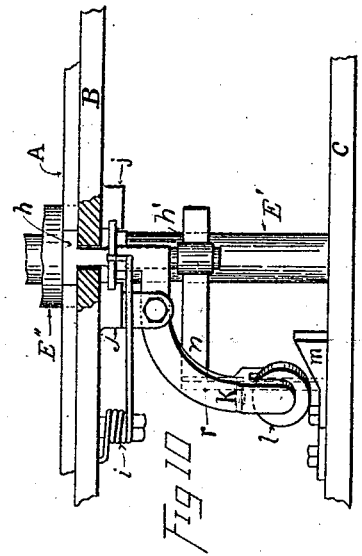

(No Model.) 4 Sheets—Sheet 1.
J. N. SHORT.
MACHINE FOR FORMING RAKE TEETH.
No. 501,217. Patented July 11, 1893.
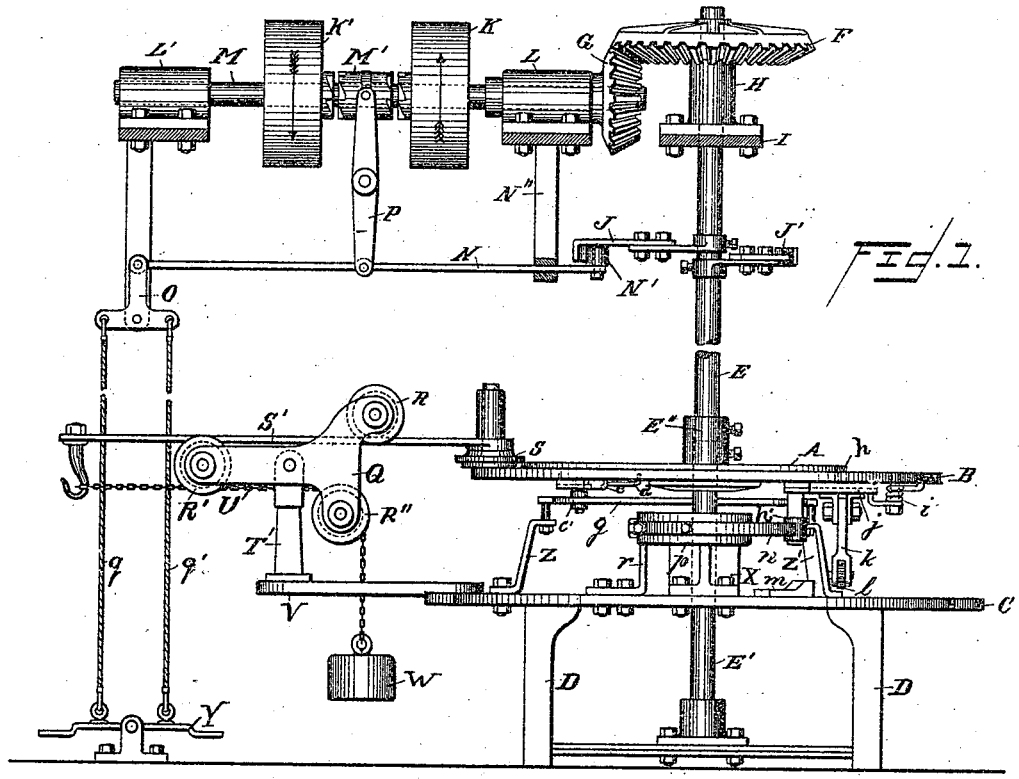
WITNESSES,
Cora P. Scoby
A. G. Prosser
INVENTOR.
John N. Short
by Cyrus Elder
his ATTORNEY.

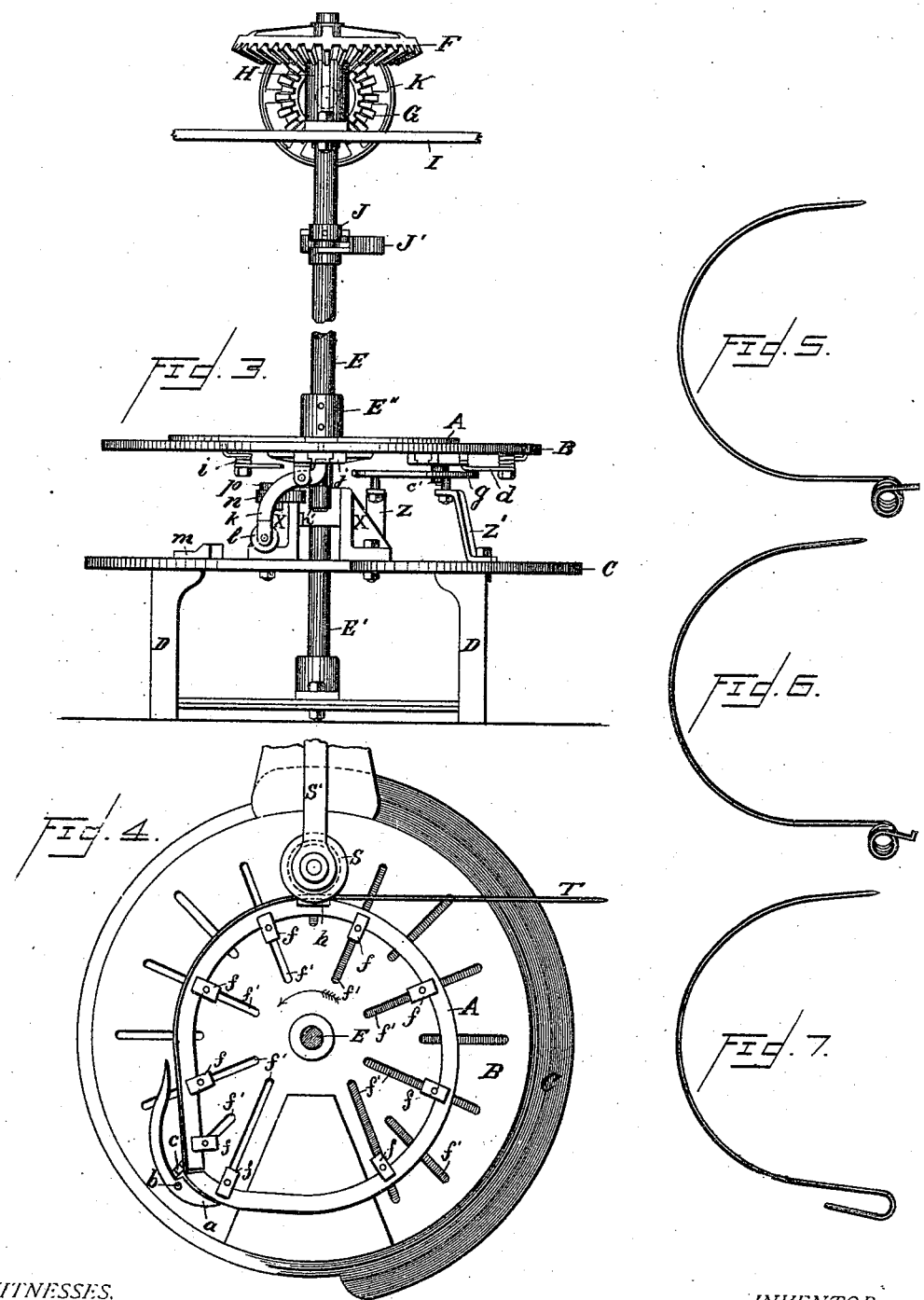

(No Model.) 4 Sheets—Sheet 3.
J. N. SHORT.
MACHINE FOR FORMING RAKE TEETH.

No. 501,217. Patented July 11, 1893.

WITNESSES,
Geo. E. Thackray.
Ed. R. Buchanan

INVENTOR.
John N. Short
by Cyrus Elder
his ATTORNEY.

(No Model.) 4 Sheets—Sheet 4.
J. N. SHORT.
MACHINE FOR FORMING RAKE TEETH.
No. 501,217. Patented July 11, 1893.
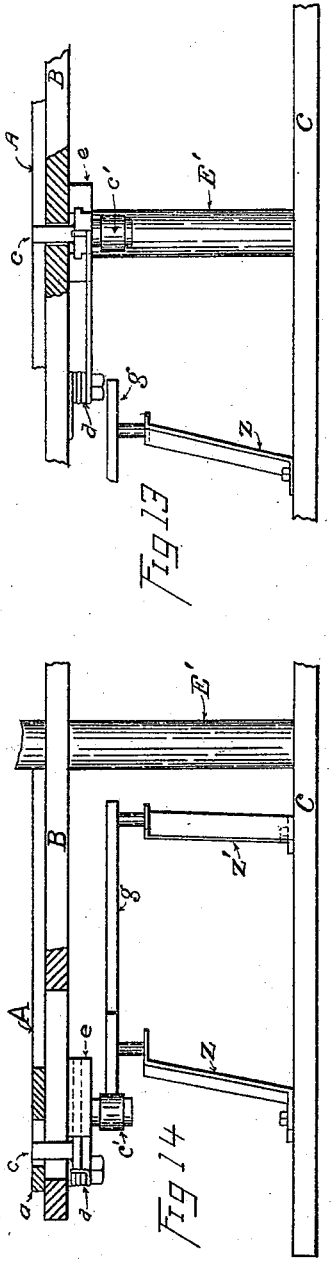
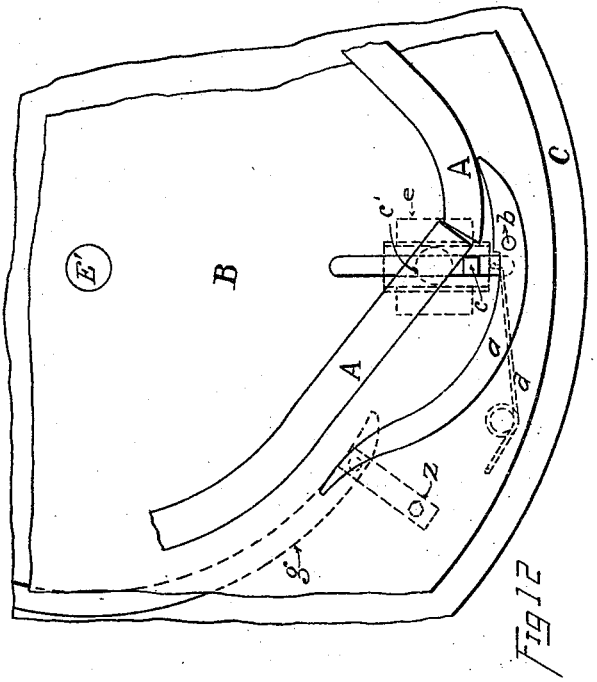
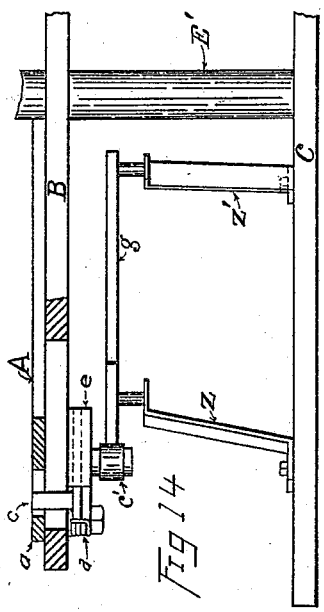
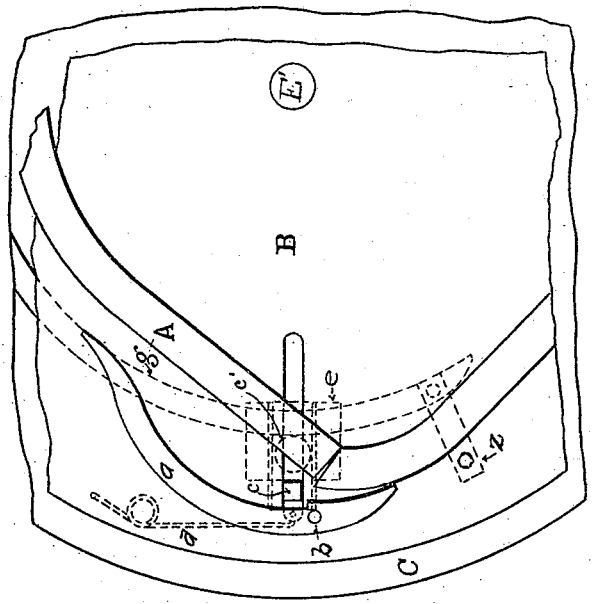
WITNESSES,
Geo. E. Thackray
Ed. R. Buchanan
INVENTOR.
John N. Short
by Cyrus Elder
his ATTORNEY.

UNITED STATES PATENT OFFICE.

JOHN N. SHORT, OF JOHNSTOWN, PENNSYLVANIA, ASSIGNOR TO THE CAMBRIA IRON COMPANY, OF PENNSYLVANIA.

MACHINE FOR FORMING RAKE-TEETH.

SPECIFICATION forming part of Letters Patent No. 501,217, dated July 11, 1893.

Application filed August 5, 1892. Serial No. 442,240. (No model.)

*To all whom it may concern:*

Be it known that I, JOHN N. SHORT, a citizen of the United States, residing at Johnstown, in the county of Cambria and State of Pennsylvania, have invented certain new and useful Improvements in Machines for Forming Rake-Teeth; and I do hereby declare the following to be a full, clear, and exact description of the invention, such as will enable others skilled in the art to which it appertains to make and use the same.

My invention relates to machines for forming horse rake teeth or other curved or bent forms of steel and iron rods or bars, and is an improvement on the apparatus for forming horse rake teeth for which United States Letters Patent No. 373,949 were granted me on November 29, 1887.

My present invention consists principally of devices for ejecting the tooth from the table of the machine after it has been formed; the application of a positive form of clutch automatically operated for transmitting motion to the machine; the use of an improved clamp or grip, and a construction of the apparatus with respect to the driving mechanism whereby it is made possible to quickly and conveniently replace a machine by another for forming a different kind of tooth. This latter is accomplished by having the principal parts of the driving mechanism located above the machine and so constructed as to be readily connected to and disconnected from the driven table of the apparatus, the connection being made by a coupling sleeve removably fastened to the driving shaft and the driven shaft of the table. My present construction also facilitates the removal of a machine and its replacement by another, by reason of the fact that in my present invention the parts necessary to be moved during such replacement are much lighter than those formerly used, because the former machine included various heavy gear wheels with their shafts, bearings and frames, which in the new machine are supported in a fixed position above it and removably connected thereto. With the old form of machine it was necessary to remove the finished tooth by manual labor, whereas in making certain forms of teeth with my new and improved machine, this labor is unnecessary as the ejector successfully discharges the finished piece from the machine with any desired degree of force without interfering with the regular operation of manufacture.

Having given this general description of my invention, I will now, to make my invention more clear, refer to the annexed four sheets of drawings, which form part of this specification, and in which like letters refer to like parts—

Figure 8:
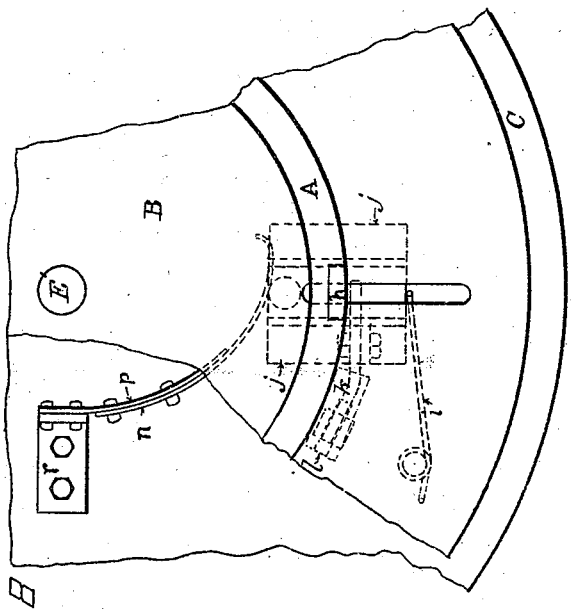
Figure 11:
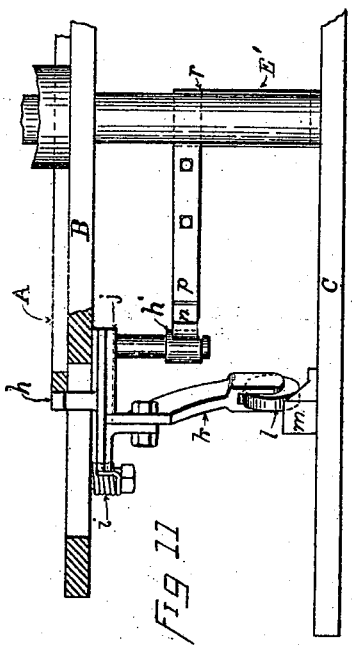
Figure 9:
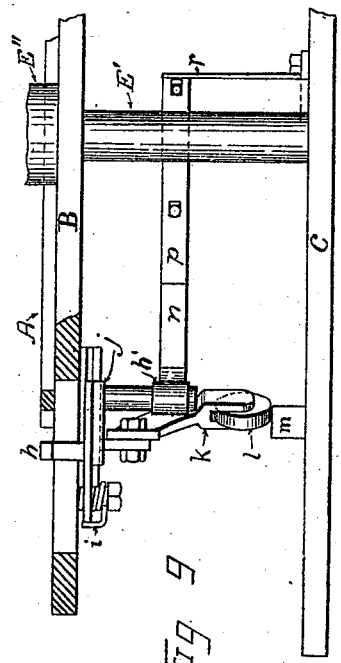

Figure 1 is a side elevation showing my improved machine with driving mechanism. Fig. 2 is a plan of above, with driving mechanism omitted for the sake of clearness, and part of the revolving table broken away to show the construction below. Fig. 3 is a front elevation of my machine, and Fig. 4 is a plan of same showing a plain tooth in process of formation, with the table moved a half revolution forward the position shown in Figs. 1, 2 and 3. Figs. 5, 6 and 7 are three typical forms of teeth made on my machine, which, however, is capable of making many different shapes not shown. Fig. 8 is a plan of part of my machine with the table broken away to show the ejecting spring and mechanism. Fig. 9 is an elevation of part of my machine showing the ejector and its mechanism with the latch tripped and ejector in its outer position. Fig. 10 is an elevation of part of my machine showing ejector and its mechanism with the latch closed as it appears just before tripping. Fig. 11 is an elevation of part of my machine showing ejector and its mechanism with the latch in position just previous to tripping. Fig. 12 is a plan of part of my machine showing the clamp for holding the end of a rod in position against the form. Fig. 13 is an elevation of the above. Fig. 14 is an elevation of part of my machine showing the clamp held in position away from the form by the action of the curved segment, ready to receive the end of a rod. Fig. 15 is a plan of the above. In Figs. 8 to 15 inclusive, the clamps *f f*, the slotted holes *f' f'*, and the bearing X, are omitted for the sake of clearness.

In the different figures, A is the form, which is secured to the revoluble table B by the clamps $f, f$, which are fastened in any desired position by bolts passing through the slotted holes $f', f'$ of the table.

C is the stationary platform of the machine, D the legs or standards, E the driving shaft which revolves in the upper bearing H, which latter is supported by the bar I, which in this case forms part of the roof of the building over the machine.

F is a bevel gear wheel securely fastened to the upper end of the driving shaft E, which wheel meshes with and is driven by the bevel pinion G, which pinion is secured to the countershaft M revolving in the bearings L, L'. This countershaft M carries two loose pulleys K, K' with clutch hubs, which pulleys are driven in contrary directions, as shown by the arrows, by means of straight and crossed belts from the line shafting.

M' is a shifting clutch loosely keyed to the countershaft M, and free to move in an axial direction but incapable of revolution with respect to said countershaft, the clutch M' being thus adapted to engage with either of the oppositely revolving clutches of the pulleys K, K', and it can consequently impart a motion of revolution to the countershaft M in either direction as desired.

P is a forked lever in connection with the clutch M', which lever is pivoted at or near its center, and connected by means of the rod N, which slides in the guide N'', the bell crank O and the ropes or rods $q\,q'$ with the treadle Y, by means of which the clutch M' may be thrown into or out of gear with either of the oppositely revolving clutch pulleys K or K'. The driving shaft E (which in the figures is shown broken away for convenience of illustration) is fitted with a removable coupling E'' by which it is connected with the driven shaft E' of the machine. The driving shaft E carries near its upper end two adjustable shifter arms J and J' which are provided at their outer ends with curved blades which are constructed to engage with the roller N' on the end of the rod N for the purpose of moving the clutch M' to a position midway between the clutches of the pulleys K K', thus stopping the revolution of the machine. The arm J' stops the table when it is in forward motion, as shown by the arrow in Fig. 4, and the arm J stops it when it is in backward motion.

S is a roll carried by the slide S' and is held against the form A or the piece to be bent to the curve of said form by the weight W and the chain U which chain passes over and is guided by the pulley R''. The slide S' is supported and guided by the rollers R and R', which together with the pulley R'' have their bearings in the frame Q, which latter is supported by the standard T' which rests on the plate V secured to the stationary platform C.

$c$ is a clamp which holds the end of a bar to be bent, firmly against the form A, by means of the spring $d$ which exerts a pressure at all times on the clamp $c$, the direction of this pressure being toward the central shaft of the machine. The clamp $c$ is supported by and moves in the slide $e$. On the lower end of the clamp $c$ is a roller $c'$ which, during a portion of the revolution of the table B, is in contact with the curved segment $g$, which is so located and adjusted as to cause the clamp $c$ to remain away from the form A when the roller $c'$ is in contact with it. When the roller $c'$ is not in contact with the segment $g$, the clamp $c$ is caused to be in contact either with the form A or the tooth T', as shown in Fig. 4, by the action of the spring $d$. The segment $g$ is supported by the brackets Z and Z', and X is the top bearing for the driven shaft of the machine, which is marked E'. I do not, however, limit myself to the specific clamping device above described, as other or non-moving devices may be used to receive the end of the bar to be formed, as may be readily understood.

$a$ is a tongue pivoted at $b$, which tongue when not subjected to pressure by the roller S is held in the position shown in Figs. 2 and 4, by a small spring which is coiled about the pivot $b$.

$h$ is the ejector, the top of which fits into and forms part of the form A, being held there by the spring $i$ except when a finished tooth is being discharged. The lower part of the ejector $h$ fits and moves in the slide $j$, and is provided with a downwardly projecting arm which carries the small roller $h'$.

The heavy curved springs $p$ and $n$ are secured to the stationary table C by means of the bent plate $r$, and are eccentrically located with respect to the axis of revolution of the table B in such a way as to produce an outward pressure on the ejector $h$ when the roller $h'$ is in contact with them.

$k$ is a latch lever pivoted to the revolving table B, with its upper end adapted to engage the ejector $h$ and hold it in position shown on plans, except when the latch is opened and the ejector is allowed to move outward whenever the roller $l$ at the lower end of the latch lever $k$ comes in contact with the tripping block $m$.

Having now described my invention, I will proceed to show how it is operated:—The stop J' is so adjusted on the shaft E that it stops the forward revolution of the table just before the tongue $a$ comes in contact with the forming roll S. When the table is in the position just described the end of a rod which is to be formed into a curved tooth is introduced between the clamp $c$ and the form A, the offset in which, near the clamp $c$, serves as a stop for the rod as it is placed in position. After the rod is so entered the operator depresses the treadle at the point marked Y with the effect of causing the clutch M' to engage with the clutch of the pulley K', thus starting the table B to revolve in a forward direction, as shown by the arrow in Fig. 4. As the table begins to revolve the clamp $c$ is brought into forcible contact with the end of the rod T and holds it against the form A, by the pressure of the spring $d$, as soon as the roller $c'$ has moved past the end of the curved segment $g$. During the first part of the forward revolution of the table B, the roller S bears against the tongue $b$, thus allowing the clamp $c$ and the end of the rod T to pass the roll S without being injured by contact with it, besides which the shape of the tongue $b$ is such that as the table revolves the roll S changes its position gradually and comes in contact with the tooth T without shock or sudden changes in its motion. As the table continues to revolve the roll S holds the tooth T against the form A, by the action of the weight W, with sufficient force to cause the tooth to assume the shape of the form. Before the revolution of the table is complete the roll $h'$ of the ejector $h$ comes in contact with the springs $p$ and $n$, which produce an outward pressure against the ejector $h$. When the table has revolved to a point such that the tooth T is no longer in contact with the roll S, the clamp $c$ is opened by the action, of the curved segment $g$, on the roll $c'$. At this instant the spring $n$ is exerting an outward pressure on the roll $h'$ of the ejector $h$ which is held from moving by the latch $k$. The various parts are so located and adjusted with respect to one another that after the clamp $c$ and the roll S are no longer in contact with the tooth T the latch $k$ is tripped by the block $m$, and the ejector $h$ is caused by the pressure of the spring $n$ to forcibly discharge the formed tooth from the table. As the table continues to revolve the roller $h'$ of the ejector $h$ is moved out of contact with the spring $n$ and the ejector $h$ is then returned to its original position as shown on the plans, by the action of the spring $i$ which is weaker than the heavy spring $n$ which moves the ejector $h$ in an outward direction as described. After the tooth has been discharged the revolution of the table is automatically stopped by the action of the arm J′ which comes in contact with the roller N′ and shifts the clutch M′ to a non-operative position in which the table is again ready for another operation.

In making some forms of teeth it is necessary to cause the table to return to its first position by means of a backward revolution, or in a direction contrary to that shown by the arrow in Fig. 4. The arm J is so adjusted as to stop the backward revolution of the table at the point proper for beginning a new operation. By giving the blades of the arms J and J′ more curvature they may also be used to reverse the motion of the table, as may be readily understood.

Having thus fully described my invention, what I claim, and desire to secure by Letters Patent, is—

1. In a machine for forming rake teeth, a revoluble forming table provided with a gripping device consisting of a short bar, working in a slide on said table, a spring attached to the table adjusted to force the bar against the former, a wheel or projection on said bar, arranged to engage with a stationary curved segment, said segment being arranged eccentrically with respect to the axis of revolution of said table, said gripping device being so arranged as to automatically clamp and release the end of a bar or rod, the parts being combined substantially as and for the purpose set forth.

2. In a machine for forming rake teeth on a revoluble table, a starting and stopping device consisting of a pair of rotary clutches, revolubly mounted on their shaft, driven in opposite directions, a double faced shifting clutch secured to said shaft in such a manner as to turn with it and adapted to engage with either of the aforesaid clutches, a system of levers connected to said shifting clutch arranged to throw it into connection with either of the driven clutches, and curved arms on the driven shaft of the forming table arranged to automatically engage with the shifting levers in such a manner as to put the shifting clutch out of connection with the driven clutches, the parts being combined substantially as and for the purpose set forth.

3. In a machine for forming rake teeth on a revoluble table, a starting and reversing mechanism consisting of a pair of rotary clutches revolubly mounted on their shaft, driven in opposite directions, a double faced shifting clutch secured to said shaft in such a manner as to turn with it and adapted to engage with either of the aforesaid clutches, a system of levers connected to said shifting clutch arranged to throw it into connection with either of the driven clutches, and curved arms on the driven shaft of the forming table arranged to automatically engage with the shifting levers in such a manner as to put the shifting clutch out of connection with one and into connection with the other of the driven clutches, the parts being combined, substantially as and for the purpose set forth.

4. In a machine for forming rake teeth on a revoluble table, an automatic ejector consisting of a plunger fitting in a recess of the former, a slide to guide said plunger, a projection or wheel on the plunger, a curved spring eccentrically located with respect to the axis of revolution of the table, adapted to engage with the projection or wheel of the plunger, and a latch arranged to hold and to release the plunger at the proper times, the parts being combined substantially as and for the purpose set forth.

In testimony whereof I affix my signature in presence of two witnesses.

JOHN N. SHORT.

Witnesses:
CYRUS ELDER,
A. G. PROSSER.